United States Patent [19]

Mizutani et al.

[11] Patent Number: 4,487,551
[45] Date of Patent: Dec. 11, 1984

[54] FAN ASSEMBLY FOR VEHICLES

[75] Inventors: Ken-Ichiro Mizutani; Hiroto Masai; Nobuyoshi Kozawa, all of Aichi, Japan

[73] Assignee: Aisin Seiki Kabushiki Kaisha, Kariya, Japan

[21] Appl. No.: 578,617

[22] Filed: Feb. 14, 1984

Related U.S. Application Data

[63] Continuation of Ser. No. 180,995, Aug. 25, 1980, abandoned.

[30] Foreign Application Priority Data

Sep. 28, 1979 [JP] Japan .................... 54-125593

[51] Int. Cl.³ .................... B64C 11/12; B64C 27/72
[52] U.S. Cl. .................... 416/135; 416/169 A; 416/134 R; 464/98; 267/161; 415/141
[58] Field of Search .............. 416/169 A, 135, 134 R, 416/131, 133; 64/27 R, 19, 23, 13; 123/41.12; 267/161, 163; 464/98, 81, 147, 150, 180; 415/140, 141

[56] References Cited

U.S. PATENT DOCUMENTS

| 766,261 | 8/1904 | Jebsen | 64/15 B |
|---|---|---|---|
| 1,854,329 | 4/1932 | Carter | 416/135 |
| 1,947,052 | 2/1934 | Lack | 64/13 |
| 2,041,555 | 5/1936 | Lee | 416/134 R |
| 3,089,342 | 5/1963 | Willis | 267/163 X |
| 3,180,571 | 4/1965 | Caroli et al. | 123/41.12 |
| 3,299,963 | 1/1967 | Lowe | 416/133 |
| 3,642,382 | 2/1972 | Hayashi | 416/241 A |
| 4,325,650 | 4/1982 | Masai | 416/135 R X |

FOREIGN PATENT DOCUMENTS

| 2451966 | 5/1976 | Fed. Rep. of Germany | 64/19 |
|---|---|---|---|
| 2740827 | 3/1979 | Fed. Rep. of Germany | 64/13 |
| 0256055 | 7/1948 | Switzerland | 64/15 |

Primary Examiner—Robert E. Garrett
Assistant Examiner—H. Edward Li
Attorney, Agent, or Firm—Finnegan, Henderson, Farabow, Garrett & Dunner

[57] ABSTRACT

A cooling fan assembly made of plastic material is composed of a plurality of fan blades and a boss and connected to a viscous fluid coupling device rotatably mounted through a bearing assembly on a driving shaft of an automotive vehicle. An axially resilient connecting member in the form of a plate spring is fixed to the boss of the fan assembly at one end thereof and to the coupling device at the other end thereof, whereby the inertia moment of the fan rotation causes the appropriate rotation of the fan assembly in spite of possible misalignment of the coupling device with respect to the driving shaft to thereby protect the bearing assembly from being damaged. Helical or waved springs may be interposed between the fan boss and the coupling device in place of the plate spring.

1 Claim, 10 Drawing Figures

FAN ASSEMBLY FOR VEHICLES

This application is a continuation of application Ser. No. 180,995, filed Aug. 25, 1980, now abandoned.

BACKGROUND OF THE INVENTION

This invention relates to a cooling fan assembly for vehicles and more particularly to a cooling fan assembly associated with a temperature-responsive means rotatably mounted on a driving shaft of an automotive vehicle.

In conventional practice, the fan assembly is rigidly mounted on a temperature-responsive rotatable means, such as a viscous fluid coupling device, by means of bolts. As a result of such rigid connection between the fan assembly and the coupling device, however a problem arises if the coupling device is improperly mounted on the driving shaft. That is, the rotation of the fan assembly fixedly connected to the coupling device eccentrically carried on the shaft may impart twisting force on the bearings between the coupling device and the shaft due to the inertial moment of the fan rotation resulting in damage of the bearings.

SUMMARY OF THE INVENTION

It is, therefore, one of the objects of the present invention to provide a fan assembly which overcomes the above-mentioned drawbacks.

Another object of the present invention is to provide a fan assembly which may be connected to a temperature-responsive rotational means through an axially resilient member to thereby compensate for the possible misalignment or eccentric mounting of the temperature-responsive rotatable means with respect to the driving shaft.

A further object of the present invention is to provide a fan assembly which is simple in construction and inexpensive to construct.

According to the present invention, the fan assembly is resiliently connected to a temperature-responsive rotatable means, such as a viscous fluid coupling device, by axially resilient means, such as plate springs, helical springs, or washer springs. Therefore, in case the coupling device is accidentally mounted on and in misalignment to the driving shaft through bearings, the inertia moment of the fan rotation will avoid the objectionable vibration of the fan assembly due to the axially resilient means and thereby protect the bearings from being damaged.

The foregoing and other objects, features and advantages of the present invention will be apparent from the following description of the preferred embodiments with reference to the attached drawings.

DETAILED DESCRIPTION OF THE PREFERRED EMBODIMENTS

Figure 1:
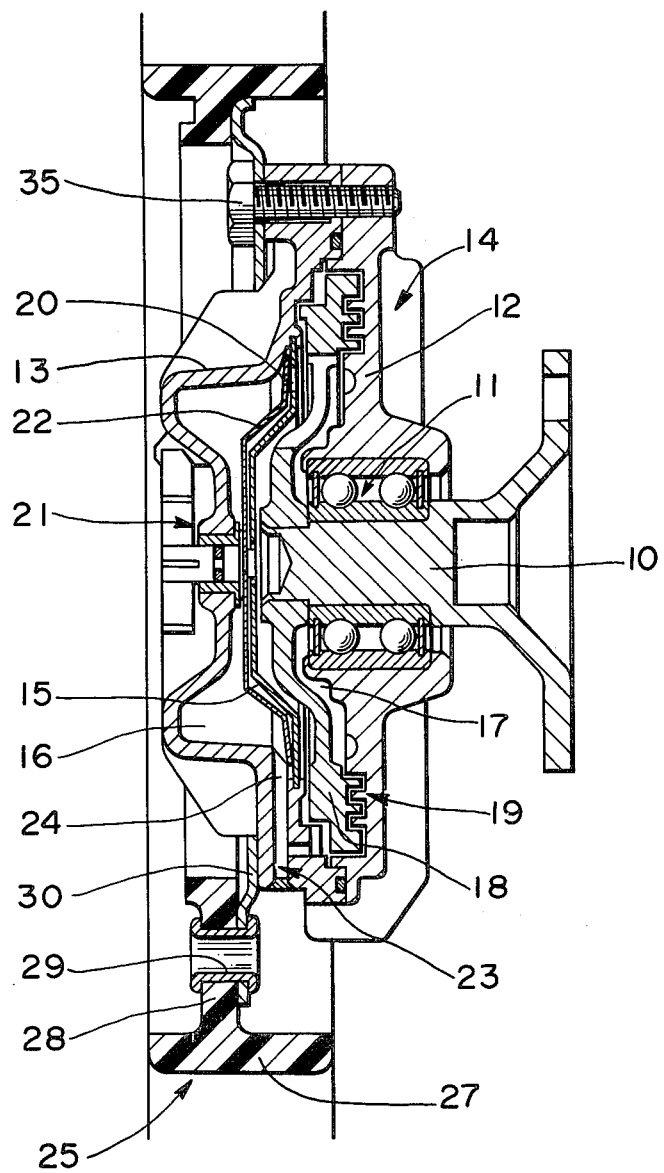
FIG. 1 is a transverse sectional view through a portion of a fan assembly connected to a viscous fluid coupling and constructed in accordance with the present invention.
Figure 2:
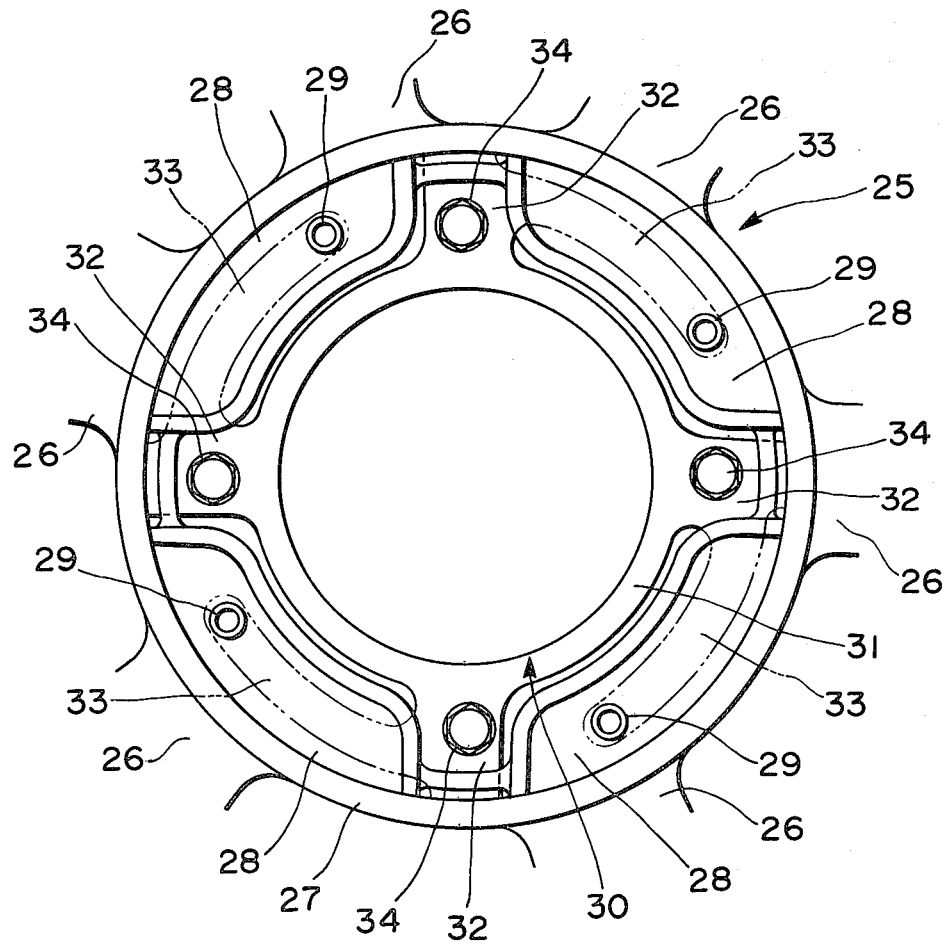
FIG. 2 is a front view of FIG. 1 but showing only the principal portions thereof.

With reference now to the drawings, especially FIGS. 1 and 2, a driving shaft 10 is activated by an internal combustion engine, not shown, of an automotive vehicle. On the driving shaft 10 is rotatably mounted a viscous fluid coupling device 14 including a housing 12 carried on ball bearings 11 and a case 13 securely fitted to the housing 12. The interior of the case 13 is divided into a fluid reservoir chamber 16 and an operational chamber 17 by means of a partition plate 15 fixed to the case 13. A rotor 18 secured on the driving shaft 10 is located in the operational chamber 17 and provides labyrinth grooves 19 at one side thereof confronting the housing 12.

The partition plate 15 is provided with a hole 20 for permitting fluid communication between the chambers 16 and 17 to thereby admit the viscous fluid to the operational chamber 17 from the reservoir chamber 16. A valve plate 22 is rotatably mounted on the partition plate 15 to open or close the hole 20 in response to movement of coiled bimetals 21 carried on the case 13. The case 13 is provided with a return passage 24 having a pumping mechanism 23 to allow the viscous fluid to return to the reservoir chamber 16 from the operational chamber 17.

In operation, when the engine temperature is increased up to a predetermined value, the valve plate 22 is rotated to open the hole 20. Thus, the viscous fluid admitted to the operational chamber 17 and particularly passing the labyrinth grooves 19 will rotate the housing 12 and the case 13 due to shearing force thereof.

When the engine temperature is below the predetermined value, the valve plate 22 closes the hole 20 to minimize the viscous fluid retained in the operational chamber 17, that is, to minimize the shearing force thereof to rotate the housing 12 and the case 13.

Such structure and operation of the coupling device 14 are conventional or obvious to those skilled in the art, and so a further explanation may be omitted.

A fan assembly 25 includes a plurality of flexible fan blades 26 and an annular boss 27 all made of synthetic resin. The boss 27 is provided with four inward projections 28 to each of which a generally circular shaped plate spring 30 is fixed through a bushing 29, as seen in FIG. 2. More specifically, the plate spring 30 made of the single metal plate is formed by an annular stem 31, four tongues 32 extending radially outward of the stem 31 and each located between the neighbouring inward projections 28 of the fan assembly 25, and four circumferential extensions 33 axially deflectable and each projecting from the tongue 32 to be secured to the inward projection 28 at the tip thereof. Each of the tongues 32 of the plate spring 30 is provided with a hole 34 through which a bolt 35 passes to rigidly connect the plate spring 30 to the case 13 of the fluid coupling device 14 (FIG. 1).

Therefore, if the housing 12 of fluid coupling device 14 should be eccentrically mounted on the driving shaft 10 or axially displaced with respect thereto, the plate spring 30 will compensate for such eccentric mounting or axial displacement of the fan assembly 25 which may, accordingly, be prevented from eccentric rotation relative to the driving shaft 10. For instance, when the coupling device 14 is accidentally mounted on the driving shaft 10 to be inclined in the counter-clockwise direction in FIG. 1, inertia moment will be applied to the fan assembly 25 which is urged to incline in the clockwise direction in FIG. 1 and will not be applied to the bearings 11. As a consequence, the fan assembly 25 is free from any objectionable mounting of the coupling device 14 and from resonance.

Figure 3:
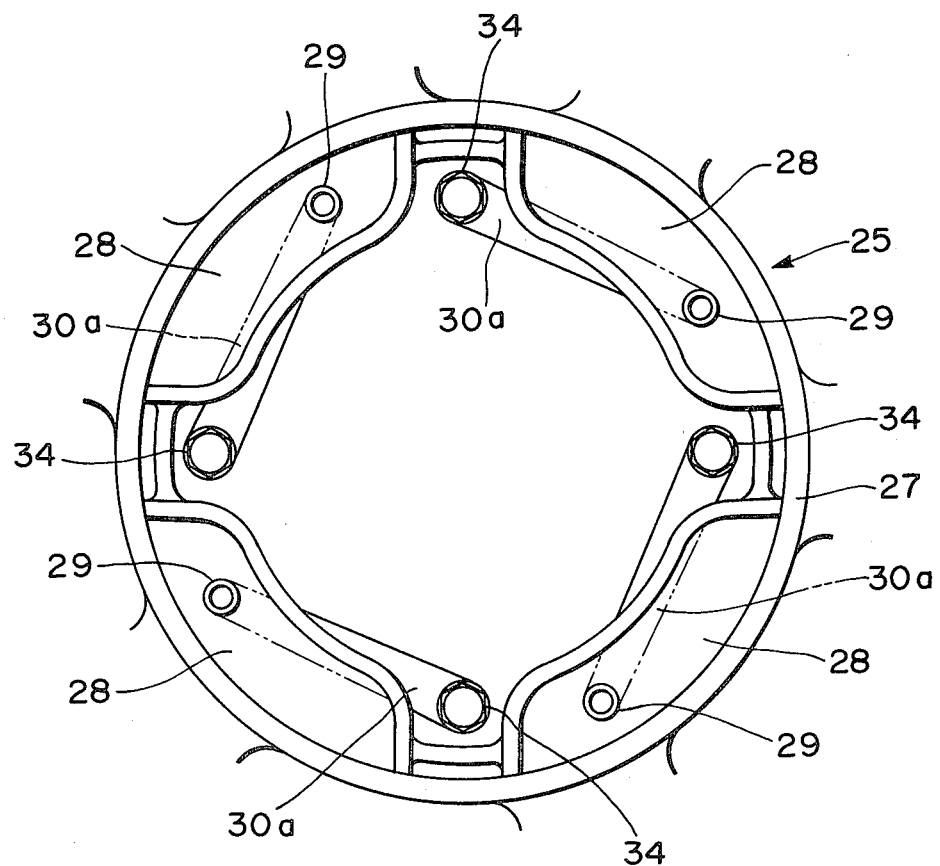
FIG. 3 is a view similar to FIG. 2 but showing another embodiment thereof.

In place of the plate spring 30 including four circumferential extensions 33, four individual plate springs 30a of a rectangular shape may be provided to ensure the axial resiliency as seen in FIG. 3 in which the reference numerals denote the corresponding elements of the previous embodiment of FIGS. 1 and 2.

Figure 4:
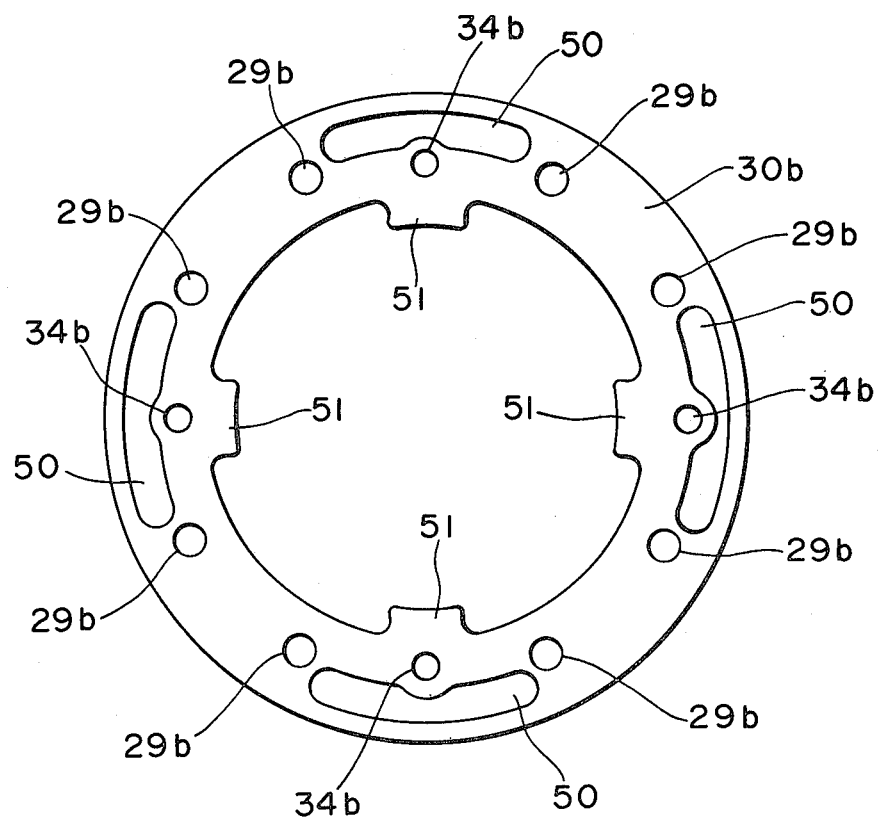
FIG. 4 is a front view of another embodiment of the invention.

FIG. 4 shows another embodiment of the plate spring. A plate spring 30b of a generally ring shape is provided with a plurality of bushing holes 29b and a plurality of bolt holes 34b. The number of bushing holes 29b is more than that of the bushing holes of the foregoing embodiments with the result that the plate spring 30b may act also as a reinforcing member against possible deformation or damage of the blade boss of the fan assembly upon rotation thereof.

The plate spring 30b is further provided with a plurality of arc-shaped recesses 50 to increase the axial flexibility thereof and radially inward projections 51 to facilitate the location thereof upon assembling.

Figure 5:
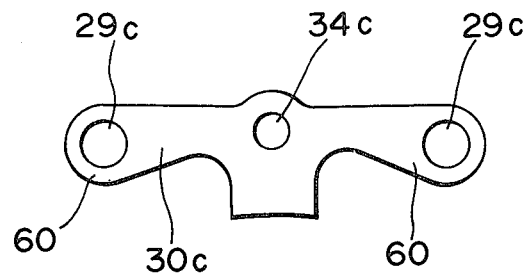
FIG. 5 is a view similar to FIG. 4 but showing another embodiment.
Figure 6:
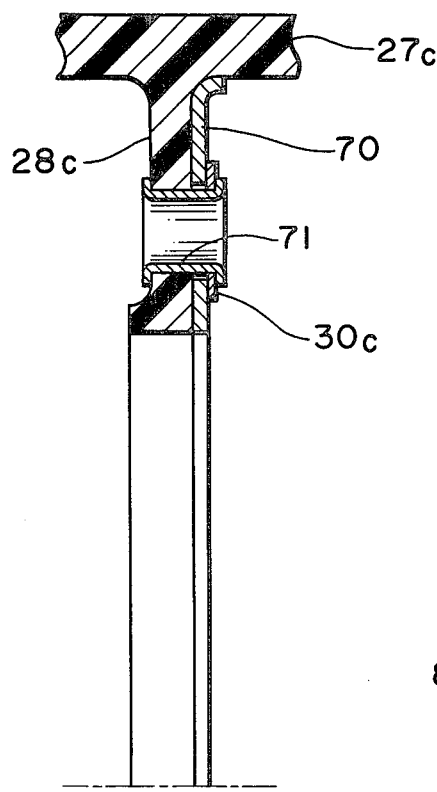
FIG. 6 is a sectional view through a portion of the fan assembly wherein the embodiment of FIG. 5 is applied.

In FIGS. 5 and 6, another modification of the invention is illustrated. A plurality of substantially T-shaped plate springs 30c are provided and arranged as in the embodiment of FIG. 3 and each plate spring 30c includes a bolt passing hole 34c at the central portion thereof and a bushing hole 29c at each arm portion 60. The plate springs 30c are securely fitted to inward projections 28c of fan boss 27c through a metal spacer 70 as seen in FIG. 6. More specifically, each plate spring 30c is fixed to the inward projection 28c of the fan assembly by means of a bush 71 and the metal spacer 70 is interposed between the plate spring 30c and the inward projection 28c to be fixed to the fan assembly by means of the bush 71. Therefore, the metal spacer 70 avoids possible deformation or damage of the fan boss upon rotation thereof and imparts reinforcement thereto.

Figure 7:
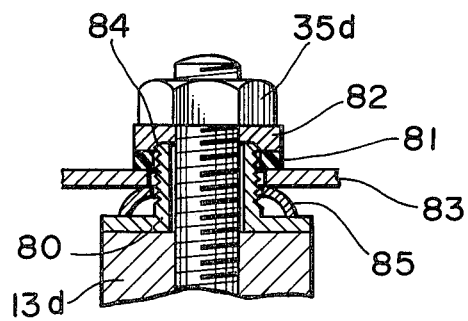
FIG. 7 is a view similar to FIG. 6 but showing another embodiment of the invention.

In FIG. 7, there is shown a further modification of the invention in which a metal spacer 83 is held on a cover case 13d of a fluid coupling device by bolts 35d through metallic bushings 80, resilient members 81 made of rubber or springs metal and bush stoppers 82 made of metal. Each of the metallic bushings 80 is provided at its external face with threaded screws 84 which are to be in threaded engagement with internal threaded screws of the bush stopper 82. The spacer 83 is fixedly connected to the boss of the fan assembly by means of suitable bushes at proper locations. Between the metallic bushing 80 and the spacer 83 is interposed a waved washer spring 85 which performs the same function as the plate springs in the previous embodiments to compensate for the inappropriate mounting of the coupling device. It will be apparent that the spacer 83 also acts as a reinforcing member as in the embodiments of FIGS. 5 and 6.

Figure 8:
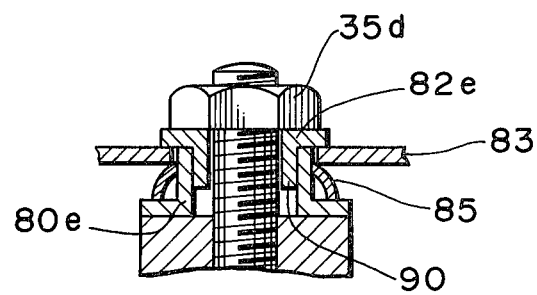
FIG. 8 is a view similar to FIG. 6 but showing another embodiment of the invention.

An embodiment of FIG. 8 is similar to the embodiment of FIG. 7 except that a smaller diameter projection 90 of a metallic bush stopper 82e is pressed into a metallic bushing 80e.

Figure 9:
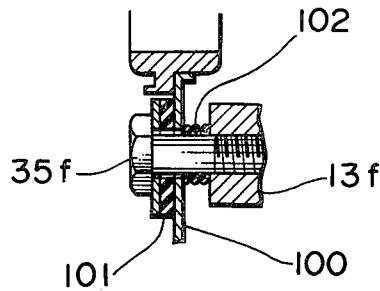
FIG. 9 is a view similar to FIG. 6 but showing another embodiment of the invention.

In a modification of FIG. 9, a metal spacer 100 secured to the annular boss of the fan assembly is held on a case 13f of a fluid coupling device by a bolt 35f through a rubber member 101 and a helical spring 102. The helical spring 102 performs the same function as the plate springs in the foregoing embodiments and the metal spacer 100 also acts as reinforcement. The helical spring 102 may be replaced by a dish spring.

Figure 10:
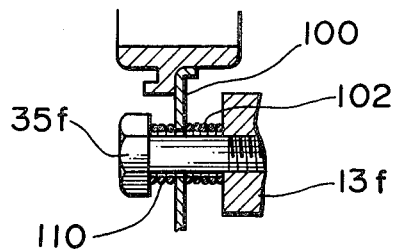
FIG. 10 is a view similar to FIG. 6 but showing another embodiment of the invention.

An embodiment of FIG. 10 is different from that of FIG. 9 only in that the rubber member 101 of FIG. 9 is replaced by a helical spring 110. Both of the helical springs 102 and 110 realize the appropriate rotation of the fan assembly regardless of improper mounting of the coupling device on the driving shaft.

While specific embodiments of the invention have been shown and described in detail to illustrate the application of the principles of the invention, it will be understood that the invention may be embodied otherwise without departing from such principles. For instance, the electro-magnetic clutch may be employed in place of the viscous fluid coupling device.

What is claimed is:

1. In a cooling fan assembly, including fan blades and an annular boss, associated with a temperature-responsive rotational means rotatably mounted on a driving shaft through a bearing assembly in a fixed housing, the improvement comprises axially resilient means for compensating for possible misalignment of said fan assembly caused by misalignment of said rotational means relative to said driving shaft upon rotation of said fan assembly due to the inertial moment thereof, said axially resilient means including: a flat, resilient, unitary, generally circular-shaped, plate spring, one face of said plate spring abutting a face of said housing, the opposite face of said plate spring abutting said boss of said fan assembly, said plate spring having an annular stem, a plurality of tongues extending radially outward from said stem, said tongues being equally spaced from each other around said stem, and an extension extending circumferentially from each tongue; means for securing each tongue to said housing; and means for securing each extension to said boss of said fan assembly.

* * * * *